(12) United States Patent
Cockx et al.

(10) Patent No.: US 7,797,691 B2
(45) Date of Patent: Sep. 14, 2010

(54) SYSTEM AND METHOD FOR AUTOMATIC PARALLELIZATION OF SEQUENTIAL CODE

(75) Inventors: Johan Cockx, Pellenberg (BE); Bart Vanhoof, Leuven (BE); Richard Stahl, Vorst (BE); Patrick David, Brussels (BE)

(73) Assignee: IMEC, Leuven (BE)

( * ) Notice: Subject to any disclaimer, the term of this patent is extended or adjusted under 35 U.S.C. 154(b) by 940 days.

(21) Appl. No.: 11/031,383

(22) Filed: Jan. 7, 2005

(65) Prior Publication Data

US 2005/0188364 A1 Aug. 25, 2005

Related U.S. Application Data

(60) Provisional application No. 60/535,274, filed on Jan. 9, 2004, provisional application No. 60/539,786, filed on Jan. 27, 2004.

(51) Int. Cl.
*G06F 9/45* (2006.01)
*G06F 13/12* (2006.01)

(52) U.S. Cl. .................. 717/155; 717/149; 717/151; 710/71

(58) Field of Classification Search ............. 717/144, 717/155–157
See application file for complete search history.

(56) References Cited

U.S. PATENT DOCUMENTS

| | | | | |
|---|---|---|---|---|
| 5,450,554 A | * | 9/1995 | Zaiki | 717/156 |
| 6,199,093 B1 | * | 3/2001 | Yokoya | 718/102 |
| 6,487,580 B1 | * | 11/2002 | Bobak et al. | 718/106 |
| 2002/0099756 A1 | | 7/2002 | Catthoor et al. | |
| 2003/0074389 A1 | * | 4/2003 | Kang et al. | 709/106 |
| 2004/0078780 A1 | * | 4/2004 | Dutt et al. | 717/106 |

FOREIGN PATENT DOCUMENTS

EP 00200117 B1 1/1991

OTHER PUBLICATIONS

Karkowski, et al., Design of Heterogeneous Multi-processor Embedded Systems: Applying Functional Pipelining, PACT'97, San Francisco, USA, Nov. 1997.
Karkowski, et al., Overcoming the Limitations of the Traditional Loop Parallelization, Proceedings of the HPCN'97, Apr. 1997.
Karkowski, et al., FP-Map—An Approach to the Functional Pipelining of Embedded Programs, 4th International Conf. on High-Performance Computing, pp. 415-420, USA, Jun. 1998.
Karkowski, et al., Design Space Exploration Algorithm for Heterogeneous Multi-Processor Embedded System Design, 35th DAC Anniversary, pp. 82-87, San Francisco, CA, USA, Jun. 1998.

(Continued)

*Primary Examiner*—Tuan Q. Dam
*Assistant Examiner*—Isaac T Tecklu
(74) *Attorney, Agent, or Firm*—Knobbe Martens Olson & Bear LLP

(57) ABSTRACT

Systems and methods are described for automatically transforming essentially sequential code into a plurality of codes which are to be executed in parallel to achieve the same or equivalent result to the sequential code. User-defined task boundaries are determined in the input code to thereby define a plurality of tasks. It is then determined if the essentially sequential application code can be separated at at least one of said user-defined tasks boundaries and if so at least one code of the plurality of codes for at least one of said tasks is automatically generated.

27 Claims, 6 Drawing Sheets

OTHER PUBLICATIONS

Kienhuis, et al., Compaan: deriving process networks from Matlab for embedded signal processing architectures, Proceedings of the eighth international workshop on Hardware/software codesign, pp. 13-17, May 2000, San Diego, California, USA.

Stefanov, et al., System Design using Kahn Process NetworksL The Compaan/Laura Approach, Feb. 2004, Paris, France.

Turjan, et al., Translating affine nested-loop programs to Process Networks, Proceedings of the International Conference on Compiler, Architecture, and Synthesis for Embedded Systems (CASES), 2004, Washington, USA.

Feautrier, P., Dataflow Analysis of Array and Scalar References, International Journal of Parallel Programming 20(1):23-53, Sep. 1991.

Maydan, et al., Data Dependence and Data-Flow Analysis of Arrays, Proceedings of the $5^{th}$ Workshop of Languages and Compilers for Parallel Computing, pp. 434-448, Aug. 1992.

Pugh, W., The Omega Test: A Fast and Practical Integer Programming Algorithm for Dependence Analysis, Communications of the ACM, 35 (8):102-114, Aug. 1992.

Vanhoof; et al., A Scalable Architecture for MPEG-4 Wavelet Quantization, Journal of VLSI Signal Processing Systems for Signal, Image, and Video Technology, 23(1):93-107, Oct. 1999.

Denolf, et al., Memory Centric Design of an MPEG-4 Video Encoder, to appear in IEEE CSVT, special issue on integrated multimedia platforms.

U.S. Appl. No. 09/484,117, filed Jan. 14, 2000, Cockx et al.

* cited by examiner

SYSTEM AND METHOD FOR AUTOMATIC PARALLELIZATION OF SEQUENTIAL CODE

CROSS REFERENCE TO RELATED APPLICATIONS

This application claims priority to U.S. Provisional Patent Application 60/535,274 entitled "METHOD FOR TRANSFORMING SEQUENTIAL CODE INTO PIPELINED CODE" and filed on Jan. 9, 2004, and U.S. Provisional Patent Application 60/539,786 entitled "METHOD FOR TRANSFORMING SEQUENTIAL CODE INTO PIPELINED CODE" and filed on Jan. 27, 2004. The disclosures of the above-described filed applications are hereby incorporated by reference in their entirety.

FIELD OF THE INVENTION

The invention relates to the field of automated methods and computerized systems for adapting of application code, e.g. an essentially sequential code, in a format suited for the system on which the adapted application code should be executed, e.g. as functionally equivalent parallelized codes. The present invention also relates to methods and apparatus for pre-compilation and compilation of essentially sequential codes to generate functionally equivalent parallelized codes. Embodiments of the invention can be used advantageously in the field of embedded systems or platforms, in particular heterogeneous systems or platforms.

BACKGROUND OF THE INVENTION

The initial specification of an application to be implemented on an embedded platform is often written in sequential code, for instance sequential C or C++ code. A typical example of an application is the MPEG-4 reference code. For a high performance low power implementation on an embedded system or platform, the code must be analyzed, transformed and parallelized before it is compiled, or more ideally when it is compiled. The target system or platform is typically heterogeneous and can contain programmable as well as custom processor cores. With parallelized is meant that the code is broken or partitioned in at least two parts, which can be executed in real-time at least partially at substantially the same time.

Parallelization is an important step that can have serious impact on performance and power. Ideally, processor load must be balanced and operations must be assigned to the processor that executes them most efficiently. In addition, inter-processor communication must be taken into account. Today, parallelization is typically done manually, by an experienced designer. As it is a time consuming and error prone task, it is typically done once in the design cycle: time-to-market pressure leaves no time for exploration.

A particular form of parallelization is so-called program splicing, determining parallel processes in sequential code, which contribute each separately to the result (or an intermediate result) of a program. Said parallel processes are not communicating information between each other.

Embedded applications such as multimedia applications are often streaming applications with a relatively complex control flow, including data dependent conditions. To distribute such an application over processors, coarse grain, also denoted task level parallelization techniques must be used. Fine grain techniques such as instruction level parallelism or fine grain data (e.g. SIMD) parallelism only apply to a single processor and cannot handle complex data dependent control flow. Parallel executable codes are denoted task parallel or coarse grain parallel if they are intended to run on a separate processor.

A streaming application is often parallelized manually by splitting it in pipeline stages. Pipelining can be considered as a subset of parallelization. Each pipeline stage is then assigned to a processor that can efficiently handle the operations required in that stage see FIG. 2. This approach differs from the approach taken by existing parallelizing compilers These compilers target symmetric multiprocessors and exploit data parallelism by executing different iterations of a loop in parallel on different processors, hence again only applicable when these iterations do not have to communicate with each other—see FIG. 2. They are not able to efficiently exploit specialized processor platforms or systems.

Other methods for performing task level pipelining (sometimes also called coarse grain or functional pipelining) to parallelize embedded applications are discussed below. There are however important differences in what these programs can do and in the restrictions they have on the sequential input description of the application to be parallelized.

The FP-Map tool [I. Karkowski, H. Corporaal, "Design of Heterogeneous Multi-processor Embedded Systems: Applying Functional Pipelining", PACT'97, San Fransisco, USA, November 1997], [I. Karkowski, H. Corporaal, "Overcoming the Limitations of the Traditional Loop Parallelization", Proceedings of the HPCN'97, April 1997] [I. Karkowski, and H. Corporaal, "FP-Map—An Approach to the Functional Pipelining of Embedded Programs", 4th International Conf. on High-Performance Computing, pp. 415-420, Bangalore, December 1997.], [I. Karkowski, H. Corporaal, "Design Space Exploration Algorithm for Heterogeneous Multi Processor Embedded System Design", 35th DAC Anniversary, pp. 82-87, San Francisco, Calif., USA, June 1998] explicitly targets embedded platforms and uses task level pipelining (also called functional pipelining). It automatically determines task boundaries based on execution times and branch probability estimates, hence without allowing user selection. FP-Map does no interprocedural analysis, and has no code generation. FP-MAP accepts arbitrary C code (i.e. it is not limited to affine nested loop programs). It automatically distributes the statements of a given loop nest over a given number of processors, minimizing the initiation interval of the pipeline. The loop nest to be parallelized must be tightly nested: a nested loop must be the only statement in the body of the surrounding loop. Function calls in the loop body are assumed to be atomic and are never distributed over processors. The data flow analysis used in FP-MAP is dynamic: data dependences are registered during execution of the C code for a given set of inputs. This means that FP-MAP can analyze data flow for arbitrary control flow including data dependent conditions and for arbitrary index expressions, but it is only correct if the selected set of inputs triggers all relevant execution paths. The distribution algorithm relies estimates of execution times and branch execution probabilities obtained through profiling. Execution times are assumed to be independent of the processor, and the cost and feasibility of the resulting communication on the target platform is not taken into account. FP-MAP does not automatically insert communication channels or generate code; the result is an assignment of statements to processors.

The Compaan tool [Bart Kienhuis, Edwin Rijpkema, Ed Deprettere, "Compaan: deriving process networks from Matlab for embedded signal processing architectures", Proceedings of the eighth international workshop on Hardware/software codesign, p. 13-17, May 2000, San Diego, Calif., United States], [Todor Stefanov, Claudiu Zissulescu, Alexandru Turjan, Bart Kienhuis, Ed Deprettere, "Compaan: deriving process networks from Matlab for embedded signal processing architectures", DATE 2004, February 2004, Paris, France], [Alexandru Turjan, Bart Kienhuis, Ed Deprettere, "Translating affine nested-loop programs to Process Networks", Proceedings of the International Conference on Compiler, Architecture, and Synthesis for Embedded Systems (CASES), 2004, Washington USA] automatically derives a Kahn process network from a sequential application. Kahn process networks are closely related to task level pipelining and are a natural match for streaming applications. However, Compaan starts from Matlab, not C, and can only handle affine nested loop programs. For COMPAAN the application to be parallelized must first be rewritten as an affine nested loop program (ANLP). A nested loop program is a program consisting of: for-loops, if-then-else statements, and function calls. A function call represents an (unspecified) operation; its inputs and outputs can be scalars and (indexed) arrays. A nested loop program is said to be affine if all index expressions, loop bounds and arguments of comparison operators in conditions are linear combinations of the surrounding loop iterators. COMPAAN can also handle some occurences non-linear operators such as div, mod, ceil and floor; these operators can be eliminated by transforming the nested loop program. COMPAAN automatically transforms an affine nested loop program into an equivalent process network. Each function call becomes a process, and processes communicate through FIFOs. If productions and consumptions of the data to be communicated match one-to-one, a plain scalar FIFO is inserted. Otherwise, a special FIFO is used that can reorder and/or duplicate tokens. Exact data flow analysis techniques [Paul Feautrier, "Dataflow Analysis of Scalar and Array References", International Journal of Parallel Programming 20(1):23-53, 1991.], [D. E. Maydan, S. P. Amarasinghe, and M. S. Lam, "Data-Dependence and Data-Flow Analysis of Arrays", Proceedings of the 5th Workshop of Languages and Compilers for Parallel Computing, pp 434-448, August 1992.], [William Pugh, "The Omega Test: A Fast and Practical Integer Programming Algorithm for Dependence Analysis", Communications of the ACM 35(8):102-114, 1992.] are used to determine where FIFOs need to be inserted and what kind of FIFO is needed.

SUMMARY OF CERTAIN INVENTIVE EMBODIMENTS

A first aspect of the invention is a computerized method for automatic transforming essentially sequential code which are to be executed in parallel to achieve the same or equivalent result to the sequential code. The parallelized code may be a task-level or coarse grain or functional parallelized code. Parallel executable codes are denoted task parallel or coarse grain parallel if they are intended to run on a separate processor.

In an embodiment of this aspect of the invention said essentially sequential code is transformed into pipelined code. Pipelining can be considered as a subset of task-level or coarse grain or functional parallelization. Pipelined code is generally code with at least two processes or tasks, one of said processes or tasks generating/producing information (data) in a first time frame, for use/consumption by another of said processes or tasks in a second (later) time frame. In pipelining, processes using different data can be executed at the same or similar time.

This first aspect of the invention can be described as a computer based method for automatic transforming essentially sequential application code into a functional equivalent plurality of codes, which comprises: receiving said essentially sequential application code, receiving user-defined task boundaries to thereby define a plurality of tasks; determining whether said essential sequential application code can be separated at at least one of said user-defined tasks boundaries and if so automatically generating at least one code of the plurality of codes for at least one of said tasks. The task boundaries may be input by a designer or may also be generated automatically by analysis of the essentially sequential code.

In an embodiment of this first aspect of the invention interprocedural code can be handled, hence the essentially sequential code can comprise of at least two different procedures or functions. Further data flow analysis can be used and can include interprocedural analysis, meaning that accesses to variables being located in different procedures or functions are analyzed. Also code of one procedure or function in the sequential code can be split and hence at least two of said generated codes include each a portion of said function or procedure.

In an embodiment of this first aspect of the invention the developed method accepts arbitrary essentially sequential code, in particular arbitrary C code and automatically generates output code. Arbitrary code means that the no specific limitations are placed on the essentially sequential code, e.g. there is no limitation that it has to be written in a language which is specifically designed for parallelization.

In an embodiment of this first aspect of the invention the methods splits the code in multiple tasks at user-specified task boundaries. Further it can insert automatically the necessary communication channels e.g. FIFO communication channels. Hence said automatic generating of code includes automatically including instructions for communication between said tasks.

In an embodiment the method does a global (e.g. including interprocedural) data flow analysis to determine which variables are live at task boundaries. The analysis correctly handles pointer passing to functions. The invented method uses a combination of interprocedural data flow and pointer analysis to determine liveness. In an embodiment thereof the data flow analysis is static. In an embodiment thereof a data flow analysis not analyzing array index expressions, but conservatively treating each access to an array element as an access to the whole array, is used. In this approach, the method can only determine the direction of a communication channel for an array if the array is only live at one task boundary. In practice, this means that arrays accessed in more than one task must be declared locally in the loop body in which they are used. If this is not the case, the method will issue an error message, indicating that it cannot handle the case. In an embodiment thereof when an array is live at a task boundary, the method inserts a block FIFO. The array is stored inside the block FIFO, and all accesses to the array are replaced by an access to the block FIFO. Block FIFOs can handle reordering and duplication of tokens. In addition, block FIFOs can be used as a scratch pad both by the producer process and by the consumer process, potentially saving memory. Embodiments of the present invention provide a determining step which comprises a step of performing a data flow analysis, globally over said essentially sequential code, for determining the liveness information of substantially all of the variables in said code; and a step of determining locally for each of said tasks whether it can be separated by only evaluating the liveness information at at least one, and preferably all of the task boundaries. The data flow analysis may include pointer analysis. The step of performing data flow analysis may treat an access to an array element as an access to the whole array.

In summary this first aspect of the invention can be described as a method, which, given user-specified, user-selected or user-defined task boundaries, automatically transforms essentially sequential application code (for instance, in written in C) into a task level pipelined code (for instance, written in SystemC), inserting communication channels where needed. The resulting code is guaranteed to be functionally equivalent to the original code.

A second aspect of the invention is a method for optimally transforming sequential code into code defining parallel processes, in particular pipelined code, being a subset thereof, said optimal transforming method exploits said automatic transforming method. In an embodiment of the present invention said method extracts task-level parallelism from sequential code.

A third aspect of the invention is a method for automatically transforming sequential code into a model suitable for scheduling, said method exploits said automatic transforming sequential code into pipelined code, followed by a method for parsing said pipelined code into said model suitable for scheduling. In a further embodiment of the invention, said automatic transforming sequential code into a model suitable for scheduling, exploits said optimal automatic transforming sequential code into pipelined code, followed by a method for parsing said pipelined code into said model suitable for scheduling.

The present invention also includes systems or apparatus for carrying out any of the above methods. In particular the present invention includes pre-compilers and/or compilers for generating the resulting codes automatically from essentially sequential input codes.

BRIEF DESCRIPTION OF THE DRAWINGS

FIG. 2 shows that, in contrast to data parallelism, task level pipelining can exploit specialized processors executing only a subset of the operations in a loop body.

DETAILED DESCRIPTION OF CERTAIN INVENTIVE EMBODIMENTS

Figure 1:
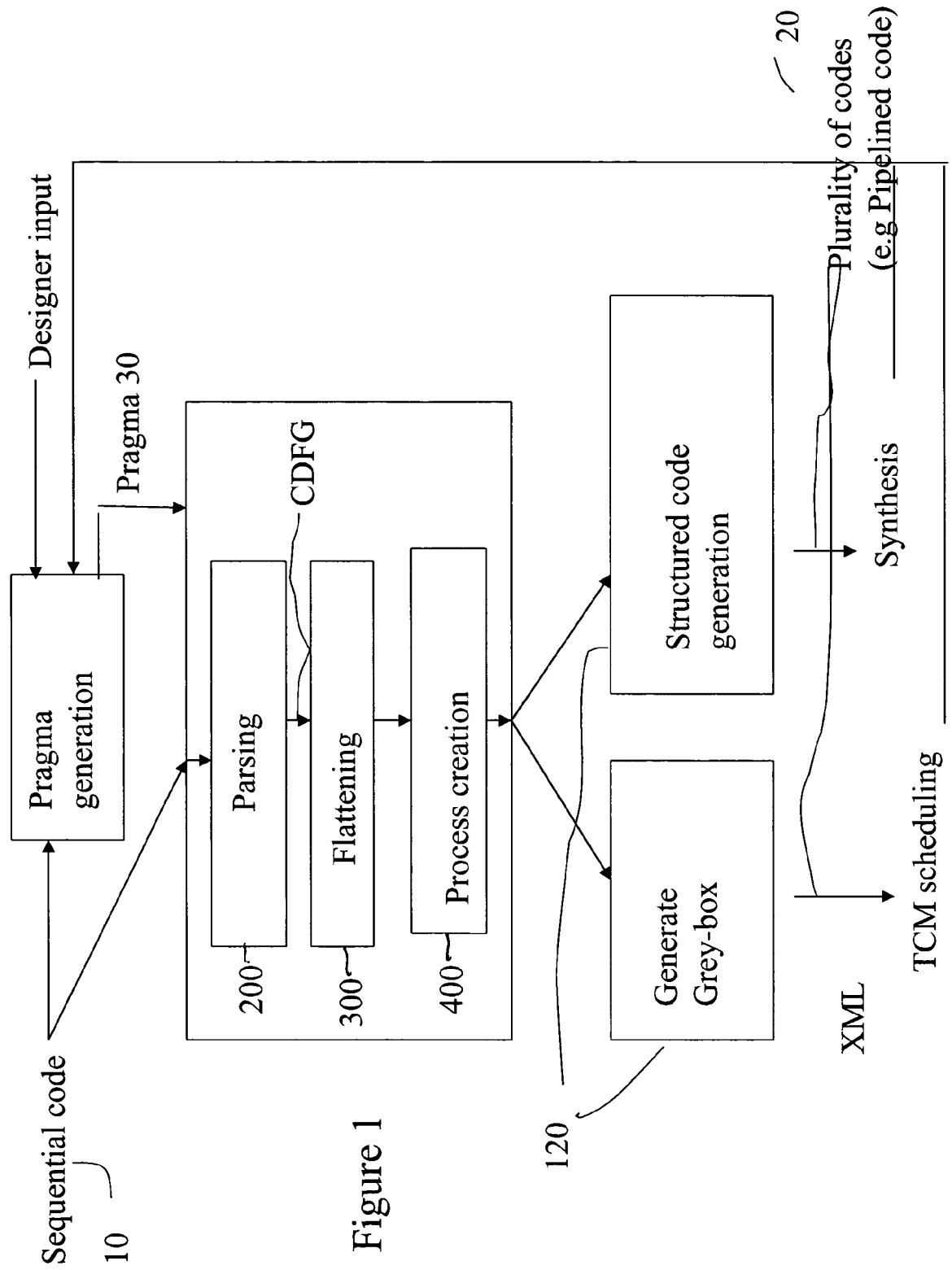
FIG. 1 is a block diagram illustrating the interaction between different aspects of one embodiment of the invention and steps of a first aspect of the invention.
Figure 2:
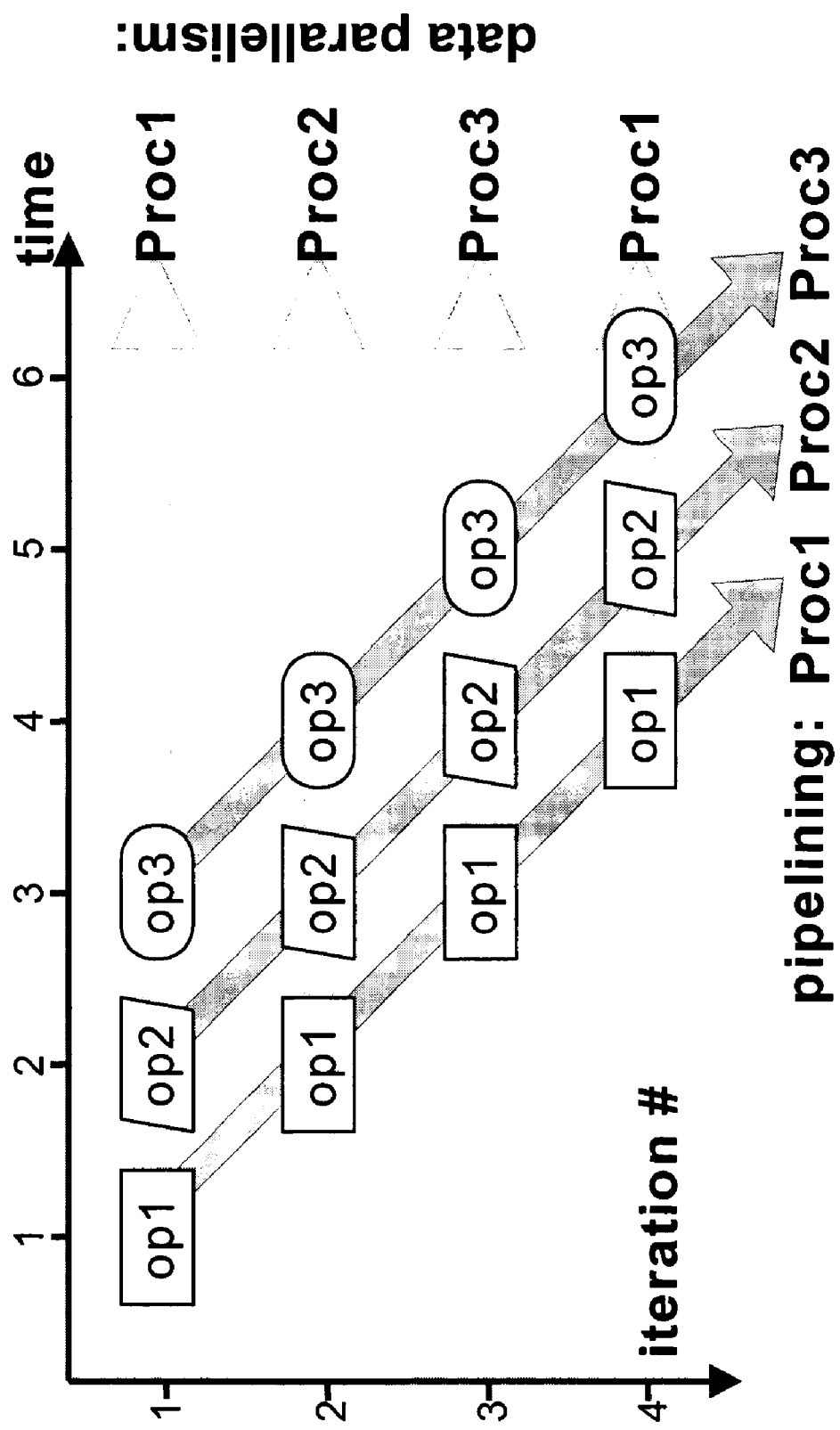
FIG. 2 is a graphical illustration comparing data parallelism and task level pipelining.

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

General Introduction

A first aspect of the invention concerns a method, with inputs: (a) essentially sequential code (FIGS. 1 and 6, (10)) in an imperative programming language (in contrast with functional languages as Prolog, Hascal), in traditional procedural languages like C, Pascal and Fortran but not limited to these, or in object-oriented languages, like C++ and Java but not limited to these, and (b) at least one instruction (30), supplied by a user, in particular a (e.g. system) designer, indicating for a portion (e.g. a list of statements) of said sequential code, that it should become a parallel process, in particular a pipelined process. Embodiments of the invented method automatically (hence by means of a computerized system) output code, in a programming language, in traditional languages like C, Pascal and Fortran but not limited to these, object-oriented languages, like C++ and Java or system design languages, like SystemC, or the one described in U.S. Pat. No. 09,484,117, EP 00200117 but not limited to these, with said requested pipelined processes. With pipelined code is meant code, comprising processes, which can be executed substantially simultaneously, in this sense that when a first process is executed in a first time frame, it generates information which is of use for a second process, executed in a second (later) time frame, said first process being executed again in said second time frame, but generating information to be used by said second process in an even later time frame. Said so-called pipelined processes communicate via the information generated or produced by one process and use or consumed by a second process. Therefore said processes can be denoted communicating processes. Hence pipelined code comprises of pipelined processes or equivalently communicating processes. Pipelining is more restrictive than parallelizing is general, and is characterized in FIFO like communication.

Said instructions are expressed in so-called pragma's (or directives), which are instructions, identifying which group or list of statements within said sequential code (e.g. possibly organized within a function) should be encapsulated into a process in the output code.

The method allows for parallelizing the code at arbitrary code boundaries in the input essentially sequential code, if this is functionally possible (otherwise an error indication is made), and is hence not limited to results provided by code boundaries predetermined by constructs in the input sequential language, like for instance function calls. User-defined directives can be understood as directives given either by a designer or by another program, analyzing the sequential code for parallelization possibilities. The directives can however introduce task boundaries at arbitrary places in the sequential code, meaning that they are not limited to given program constructs, on the contrary, task boundaries across program constructs like procedures or functions are possible.

Further the method does allow parallelization of untightly nested loops, meaning that function calls within such loops can be distributed over different processors.

Figure 6:
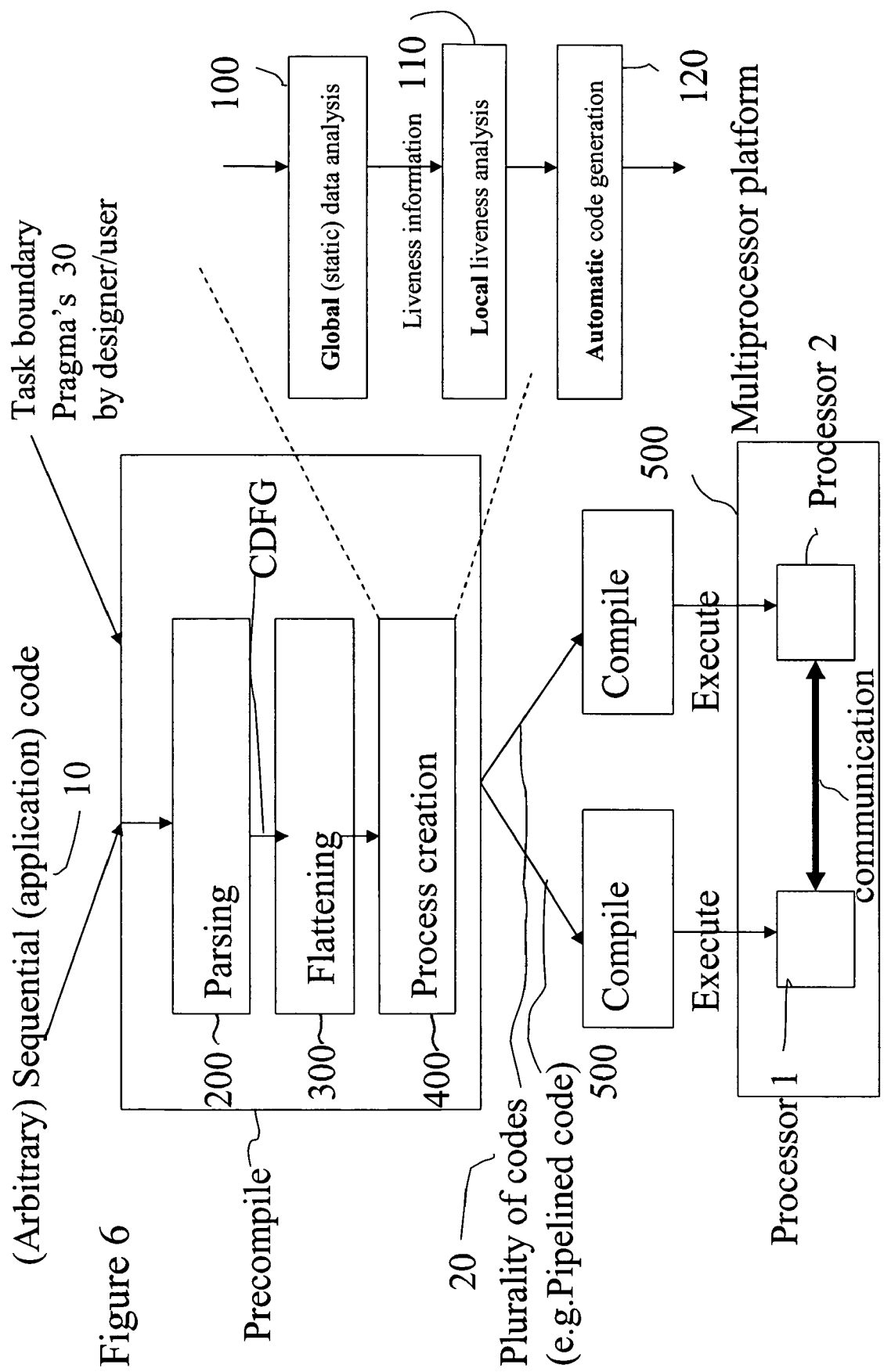
FIG. 6 is a block diagram of a process according to one embodiment of the invention. Specifically, the block diagram of FIG. 6 illustrates the use of a global interprocedural static data analysis and a local liveness analysis, and also illustrates the embodiment of the invention in a context of subsequent compilation of the resulting codes.

The method for automatic transforming essentially sequential code into equivalent functional parallelized code, e.g. pipelined code, comprises a method of process creation (see FIGS. 1 and 6, (400)). The essentially sequential code can be considered as a single process. Said step of process creation creates at least a new process, comprising of a group of statements of said sequential code and identified by said instructions (e.g. by pragrna's or directives or user input task boundaries). Further said step of process creation inserts communication mechanisms (where needed) between said new process and the existing ones, such that the transformed code is functionally equivalent with the original sequential code. With functionally equivalent is meant that the externally visible behaviour of said codes except timing aspects is the same, hence said functionally equivalent codes will procedure the same output files from a given set of input files, except the writing order of these output files may differ.

Alternatively formulated the method outputs for each of the identified processes code in one or more (sequential or imperative) languages, each of said process codes include statements found in said initial code and further each of said process codes include instructions, dedicated for providing communication (with another of said process codes). In an embodiment said communication instructions are read and/or write statements to variables, provided for said communication. The method can therefore be phrased as a method for automatic transforming sequential code (10) into a plurality of codes (20), being capable of communicating, in particular in a pipelined fashion, or as a method for generating a plurality of (communicating) codes or codes capable of communicating, in particular in a pipelined fashion, from an inputted sequential code. Said generated codes are parallel codes or parallel executable codes, hence said codes can be parallel executed, more in particular in a pipelined fashion.

This approach is particularly suited for heterogeneous multiprocessor platforms, being platforms with multiprocessors, with a least two processors having different processing capabilities. These processors can be programmable as well as custom processor cores. Therefore the invention can be seen as a method for adapting essentially sequential code into a code format, suitable for execution, especially parallelized execution, on a heterogeneous multiprocessor platform, especially in case where said sequential code described embedded applications, like streaming applications, with complex control flow, including data dependent conditions. Said parallel executable codes can be denoted task parallel or coarse grain parallel since they are intended to run on a separate processor or processors. As an embodiment the complete flow from said sequential code towards separate compiled codes can be considered. In this embodiment a step of compiling (see FIG. 1, (500)) at least two of said parallel executable codes is included, each with a compiler, suitable for the processor on which said compiled code will be executed or run. The method can be applied in different ways; in a first design-time way the conversion from sequential to parallel and the subsequent compilation of the different parallel code is completely performed at design-time. In another run-time way this conversion is done at run-time, implying that at least one processor on the multiprocessor platform accepts the sequential code as input and executes the conversion method, further executes each of said compilations. Further the compiled codes are distributed to the assigned processor and executed thereon. Alternative ways wherein part of the method is performed on design-time and part on run-time are possible. A particular approach could be the use of a first conversion from sequential code into partly parallel code at design time, hence under the designers supervision, followed by a second further conversion at run-time, depending on the targeted platform.

The method for automatic transforming sequential code into parallelized, especially pipelined code in accordance with an embodiment of the present invention, comprises a method of process creation, with thereafter a step of structured code generation. With structured code is meant code using hierarchical statements (like if-then-else, for-loops, while-loops) to represent control flow. The output of the process creation step will typically be unstructured code, relying on go-to statements and labels to represent control flow.

An embodiment of the invention is shown in FIGS. 1 and 6 and includes automatically transforming sequential code (10) into parallelized code (20), especially pipelined code by operating on a control flow graph description and hence includes a step of parsing (200) the sequential code into a (first) control flow graph description or an equivalent description like an abstract syntax tree, preferably followed by a step of control flow graph flattening (300), e.g. generating in another (second) control flow graph description. Further said method includes a step of unparsing the control flow graph description (e.g. a third control flow graph description), generated by modifying the original control flow graph during said process creation step, optionally after applying said step of structured code generation. Said unparsing step performs the opposite operation of said parsing step. Said structured code generation (120) can be understood as the reverse operation of said flattening step. Said structured code generation is of importance for synthesis tools.

In embodiments of methods according to the present invention, at least two pipelined processes are determined. One of said processes generates/produces information (data) in a first time frame, for use/consumption by another of said processes in a second (later) time frame. The pipelined nature of the processes implies that the communication between these communicating processes requires uni-directional point-to-point communication mechanisms. With point to point is meant that said mechanism is used/accessed by exactly two processes. With uni-directional is meant that one of the processes is called the producer process and the other process is called the consumer process and data is never communicated through the mechanism from the consumer to the producer.

In embodiments of the present invention it is evaluated whether the parallelization as requested by the designer, e.g. by inputting user defined task boundaries or via the inputting of pragma's or directives, is possible, by performing an analysis on the liveness of the variables at the requested task boundary or boundaries, hence a local analysis is sufficient. Naturally such analysis is preceded with a liveness analysis being performed substantially globally on the inputted sequential code. In an embodiment of the invention the method confirms the parallelization possibility if all variables at a requested task boundary are either alive as input of said task or as output of said task, and denies the parallelization possibility if a single variable at a requested task boundary is alive both as input or as output. In a refined embodiment of the invention the method confirms the parallelization possibility if all variables, except the ones not changed within the task, at a requested task boundary are either alive as input of said task or as output of said task, and denies the parallelization possibility if a single variable, except if it is not changed within the task, at a requested task boundary is alive both as input or as output. In an embodiment of the invention the used data flow analysis is conservative, since it considers any access to an array element as an access to the whole array. However the method does handle pointers to arrays that are passed through function calls, in order to realize an interprocedural analysis.

In an embodiment of this first aspect said process creation step includes a step of generating a so-called invocation graph from said control flow graph description or representation of said sequential program. A control flow graph description or representation of a program is a directed graph wherein the statements of said program are represented as nodes and control transfers as edges. An invocation graph of a program is also a directed graph wherein the functions of the program are represented as nodes and an edge between functions indicates whether one of the functions can invoke the other.

In another embodiment of this first aspect of the invention said step of process creation is such that the complexity is still manageable even when said sequential code includes a lot of pointers, in particular in said data flow analysis used in said process creation. A particular feature for solving this is making a distinction between so-called root variables and primary variables, carrying data and providing a single channel for each root variable.

In another embodiment the use of object FIFO's is highlighted as it improves the implementation speed of the devices, designed from said pipelined code.

In another embodiment further optimization of the parallelization is performed, in particular by attempting to place the commit statement as soon as possible and the request statement as late as possible.

In a second aspect of the invention a method for optimally transforming sequential code into parallelized, code, especially pipeline code is provided, the method comprising a step of inputting said sequential code; a step of generating instructions, indicating which portions of said sequential code should become which pipelined process, thereafter followed by said automatic transforming method, using said generated instructions.

In an embodiment of said second aspect said generating of said instructions (e.g. pragma's or directives) is based on analysis of said sequential code.

In an embodiment of said second aspect said generating of said instructions (e.g. pragma's, directives) is based on inputs of a designer.

In an embodiment of said second aspect said generating of said instructions (e.g. pragma's) is based on information obtained after applying said automatic transforming method, for instance by analysis of said pipelined code or said model suitable for scheduling or measures obtained by simulating said scheduled model. The invention then provides in a feedback arrangement.

In an embodiment of said second aspect combinations of one or more of said inputs for said step of generating said instructions (e.g. pragma's or directives) can be used.

Said second aspect of the invention can be cast in a context wherein applications, written by application designers, as sequential programs (procedural or object-oriented) are to be mapped onto multi-processor embedded systems, said processors being connected by an interconnection network. Hence said transformation method can use information about said system, for instance on the capability of each processor to handle certain processes and the capability of the interconnection network to handle the communication. Hence said transformation method is made optimal given the target platform. This approach is particularly suited for heterogeneous multiprocessor platforms, being platforms with multiprocessors, with a least two processor with a different processing capability. These processors can be programmable as well as custom processor cores.

Said second aspect of the invention acts on the parallelism between tasks within programs, called task parallelism or coarse grain parallelism or functional parallelism, different from prior-art fine grain techniques such as instruction-level parallelism, loop-level parallelism and fine grain data (SIMD) parallelism, though these different types of parallelism can be exploited in combination. Said fine grain techniques only apply to a single processor and cannot handle complex data dependencies. Said task parallelism is inherently global over the program.

In an embodiment of this second aspect of the invention as an optimization criterion the computational balance is used, meaning that an ideal partitioning creating tasks with substantial equal execution times will be aimed at. This approach requires performance analysis, for instance including a critical path analysis.

In an embodiment of the invention as further optimization criterion the communication overhead is used, in the sense that minimal communication between tasks is aimed at. This approach requires communication overhead estimation.

In an embodiment of the invention information obtained from simulation of the obtained pipelined code on a single processor computer can be used. As such simulation is to give information on how said pipelined code will run on a multi-processor embedded system, a concept of virtual time is useful. Languages as described in U.S. Pat. No. 09,484,117, EP 00200117 can be used therefore.

A third aspect of the invention is a method for automatically transforming sequential code into a model suitable for scheduling As energy consumption is today a major design issue when running real-time dynamic applications on compact and portable devices and since a large fraction of this energy is dissipated on the processors running the application, an important way to reduce the energy consumption is to combine dynamic voltage scaling (DVS) with dynamic power management (DPM). However for applications with non-deterministic behavior and dynamic task creation, this is not feasible at design time. Existing run-time schedulers only have a local view inside active tasks to avoid too many overhead. The invention is applicable in so-called design-time scheduling exploration, which is further combinable with flexible run-time scheduling, to efficiently implement real-time dynamic applications on an embedded multi-processor platform. Said design methodology is called Task Concurrency Management (TCM) and is further described in U.S. Patent Publication No. 02-0099756, published Jul. 25, 2002, hereby incorporated by reference. The initial step of the methodology consists for the designers to specify an embedded application at a greybox abstraction level, which is a multi-task graph (MTG) model combined with high-level features of a control-data flow (CDFG) graph model. The invention outputs a model suitable for scheduling, capable of specifying an embedded application, as a multi-task graph (MTG) model, further combinable with high-level features of a control-data flow (CDFG) graph model. Such specifications represent concurrency, timing constraints, and interaction at either an abstract or a more detailed level, depending on what is required to perform good exploration decisions later. Yet, to keep the complexity at an acceptable level, it does not contain all implementation details. Within this specification, the application is represented as a set of thread frames. Non-determinism behaviors can occur only at the boundary of thread frames. Each thread frame is a piece of code performing a specific function, which is partitioned into thread nodes, the basic scheduling units. The maturity level reached by TCM methodology has lead us to start the implementation of an integrated suite of tools automating as much as possible the TCM flow. The first tool of this flow aims at deriving a greybox model description from the application specification. The invented method of transforming sequential code to parallel code, in particular pipelined code can be part thereof.

In an embodiment thereof the input is the application C/C++ code and the output is a XML description of the greybox model. A XML schema is defined formalizing the greybox XML description.

The high-level behaviour of the so-called greybox parser tool can be decomposed as follows: (1) greybox constructs are identified in the code through syntax annotations either by the designer, another tool or a combination thereof as described by the second aspect of the invention, (2) the annotated code is processed by a C/C++ parser, of which the invented method of transforming sequential code to parallel code, in particular pipelined code can be part thereof.

In such embodiment of the invention said method for automatically transforming sequential code into parallelized code, especially pipelined code operates on a control flow graph description and hence includes a step of parsing the sequential code in to a (first) control flow graph description (or an equivalent description like an abstract syntax tree), preferably followed by a step of control flow graph flattening (generating in another (second) control flow graph description). Further said method includes a step of generating said gray box model representation from the control flow graph description (a third control flow graph description), generated by modifying the original control flow graph during said process creation step.

Said third aspect of the invention integrates said automatically transforming method as a pre-processing step of the TCM flow, in order to reduce the designer's manual work. Indeed manual annotations can be replaced by following actions: (1) manually mark the begin and the end of thread frame and thread node functions or generate these with the tools of said second aspect of the invention, (2) derive an equivalent application specification making use of the thread frame and thread nodes functions and parallelizing them when possible.

Comparison with the Prior-art

A tool for task level pipelining can be characterized by three key elements: task boundary selection, data flow analysis and communication channels used in the parallelized code. Table 1 gives an overview. Note that combining these three elements in a tool is a non-trivial task. It is not possible to arbitrarily select techniques from table 1 and simply paste them together to obtain a new tool. The value of each tool derives in part from how it integrates these techniques. For the discussion below an embodiment of the invented method is denoted further denoted SPRINT

TABLE 1

Distinguishing features of COMPAAN, FP-MAP and SPRINT

| | | | |
|---|---|---|---|
| COMPAAN | Task boundary selection all function calls in ANLP | Data flow analysis exact but ANLP only | Communication channels (reordering/duplicating) FIFOs |
| FP-MAP | automatic in given loop nest | Dynamic, any code | None - no code generation |
| SPRINT | manual, function or labels | conservative, any code | (block) FIFOs |

Task Boundary Selection

All three tools require some user interaction for task boundary selection. A good tool should minimize the user effort to explore different parallelizations.

COMPAAN creates a task for each call in the affine nested loop program (ANLP). This means that the loop boundaries are determined by how the application code is rewritten as an ANLP; in other words, the user manually specifies task boundaries by distributing statements between function calls in the ANLP. Rewriting an application as an ANLP and verifying that the ANLP is equivalent to the original code is in general a non-trivial task. It also requires that non-linear or data dependent conditions or loop bounds are hidden in functions. As a result, task boundaries cannot be located in code executing under such conditions.

In FP-MAP, a loop to be parallelized must be selected. In addition, if statements in a function called from the loop body are to be moved to different tasks, the function call must be inlined. Function inlining is a (relatively) simple and well-known technique, but deciding which function calls to inline is not. Once a loop has been selected and inlining has been done, FP-MAP will automatically determine task boundaries. There is however no guarantee that the selected task boundaries are optimal, since FP-MAP does not consider communication costs or the differences between the execution times of statements on heterogeneous processors.

For SPRINT, i.e. in accordance with embodiments of the present invention, task boundaries are specified manually as user directives in a separate file or optionally task boundaries may be specified by another means, e.g. another application program running on a computer and analyzing the input sequential code, an abstract tree or a data flow graph, for example. If the task boundaries coincide with function boundaries, no changes to the application source code are required. Otherwise, labels are inserted to indicate the position of the task boundaries in the source code. Since labels do not change the behavior of the code, no complex verification of the functionality is required. Task boundaries can be specified in any function without inlining. Task boundaries can also be specified in conditionally executed code, even if the condition is not a linear combination of the surrounding iterators.

In other words, manual specification of task boundaries as required for SPRINT is not as cumbersome as it may seem at first sight. If the work required to prepare the code for COMPAAN or FP-MAP and the limitations of these tools are also taken into account, SPRINT is more flexible and often requires less manual effort than its competitors.

Data Flow Analysis

SPRINT's data flow analysis is conservative: it handles any access to an array element as an access to the whole array. It does however handle pointers to arrays that are passed through function calls (interprocedural analysis).

In contrast, both COMPAAN and FP-MAP do a detailed analysis of array accesses. This allows them to analyze cases where SPRINT can only produce an error message. However, the ability to do a detailed array analysis in not without cost. COMPAAN is limited to affine nested loop programs and cannot do interprocedural analysis. FP-MAP relies on dynamic data flow analysis, which is only correct if the user-supplied test cases trigger all relevant execution paths.

All three approaches to data flow analysis require user interaction in some cases. For SPRINT and COMPAAN, the application code may have to be rewritten to work around the tool's limitations. For FP-MAP, the user must supply test cases and verify their coverage. For SPRINT, the use of a shared$_{13}$ variable directive is an alternative to rewriting the code in some cases, but this also requires user interaction to ensure correct synchronization. SPRINT's data flow analysis is extendible with the techniques for detailed array analysis for instance as used in COMPAAN where the code is in ANLP form; this would reduce the number of cases requiring user interaction.

Communication Channels

During parallel code generation, communication channels may need to be inserted. The key issue is how to do this for arrays, especially when write sequence in the producer does not match the read sequence in the consumer. FP-MAP avoids this problem altogether by not generating code. This means that the user is responsible for this cumbersome and error-prone task. From its exact data flow analysis, COMPAAN knows the exact read and write sequences in the consumer and producer tasks accessing an array. If the sequences do not match, it inserts a special FIFO channel that reorders and/or duplicates tokens as required. Such a channel requires more memory than a plain FIFO, but the additional memory is minimized for the given read/write sequences and is always less than or equal to the amount of memory needed for the original array.

SPRINT does not analyze the read and write sequences, but inserts a block FIFO channel. The tokens in a block FIFO are arrays. All accesses to the array are replaced by accesses to a token in the block FIFO and the array is removed from the original code. Compared to the approach of COMPAAN, this approach may require more memory: since the access sequences are not known to SPRINT, the amount of additional memory cannot be minimized. On the other hand, SPRINT's block FIFO's can be used as a scratch pad: the producer task can also read the values it has previously written to the FIFO, and the consumer can also write values and later read them back. This will result in decreased memory usage in some applications.

An Embodiment of the Sprint Tool

Figure 3:
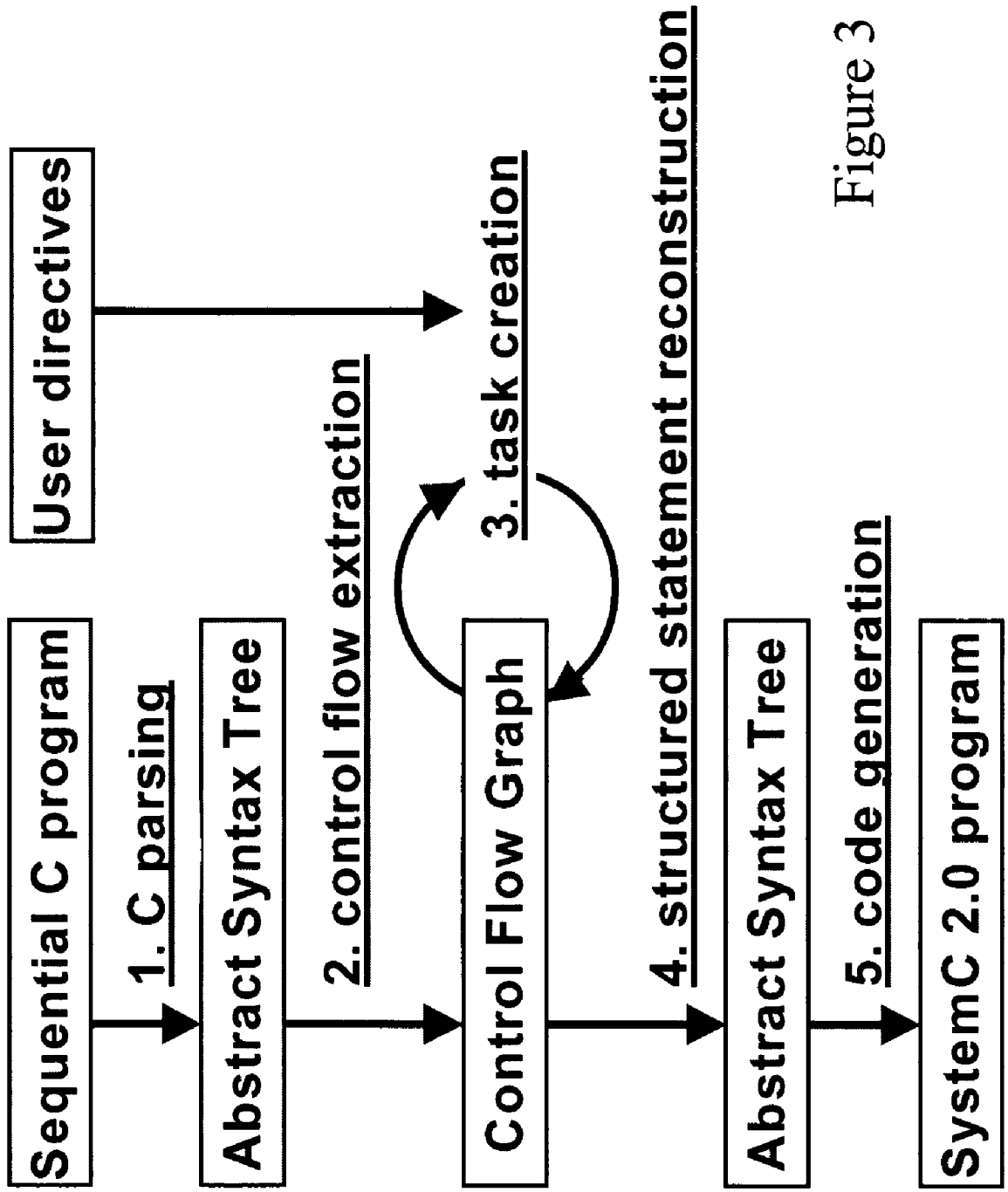
FIG. 3 is a flow diagram illustrating some steps of one embodiment of the invention for transforming a sequential (C) program into a parallel (SystemC) program.

The SPRINT tool, in accordance with one embodiment, transforms a sequential application program in a first language such as a C program into a functionally equivalent parallel set of codes, e.g. in a second language such as a SystemC program consisting of tasks (e.g. SystemC thread processes) and unidirectional point-to-point communication channels. Task boundaries are defined by user directives, but communication channels are inserted automatically as needed to ensure functional equivalence of sequential and parallel code. The transformation is done in five steps as shown in FIG. 3. The steps include: step 1: parsing the essentially sequential program code into an abstract syntax tree description, step 2: control flow extraction to generate a control flow graph, a control flow graph can be generated for each function in the original code, step 3: create tasks using user task boundary definitions, in step 4 structured statements (e.g. if-then-else, for and while loop, block, switch) are reconstructed, in step 5 the parallelized code is generated. Steps 1 to 4 may be carried out in a pre-compiler whereas the final code generation can be made on a compiler or compilers suited to the target microprocessors or processor cores.

Figure 4:
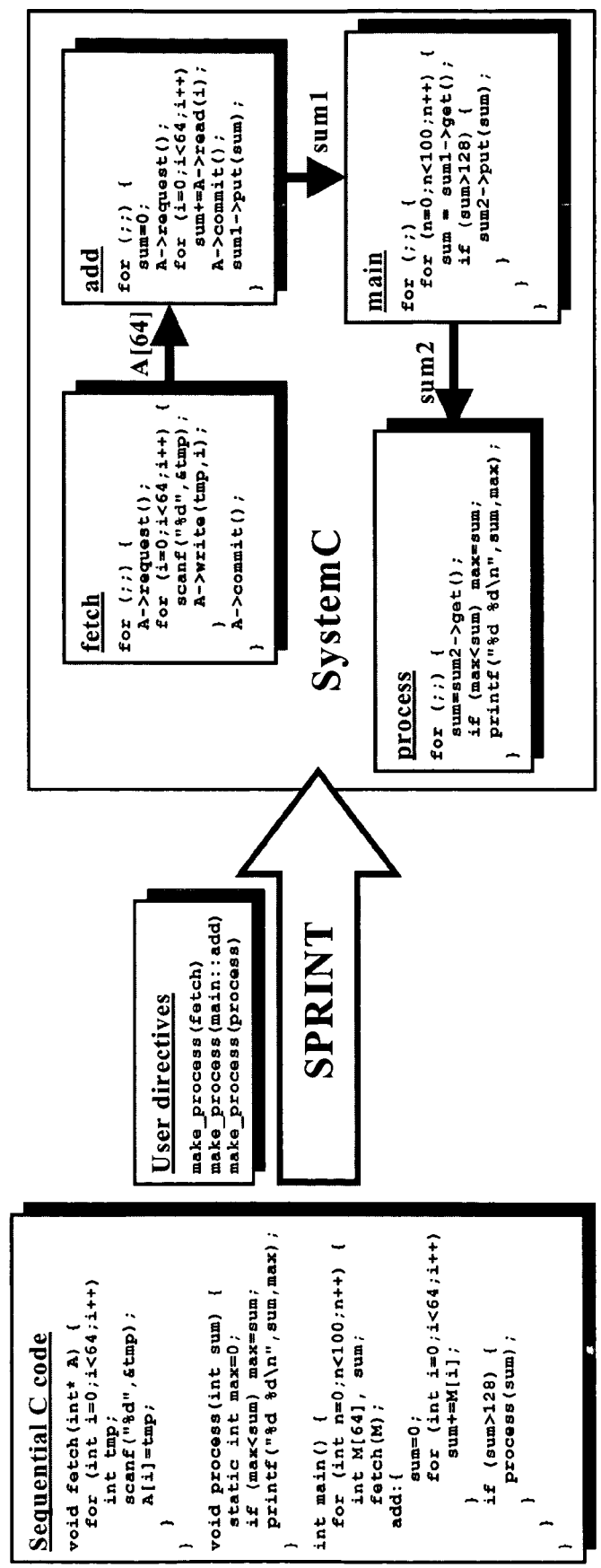
FIG. 4 is an exemplary illustration of how an embodiment of the invention transforms sequential code to parallel (SystemC) code with user specified task boundaries. The example includes block (A[64]) and scalar (sum1,sum2) FIFO channels and channel with data dependent communication rate (sum2).

The input and output of SPRINT for a small example are shown in FIG. 4. A control flow graph is constructed for each C function. Nodes correspond to statements, edges to control transfers. Structured statements (e.g. if-then-else, for and while loop, block, switch) are flattened. To aid variable liveness analysis, a special clear statement is inserted where local variables in a block statement go out of scope; at that point, the local variable is known to be dead. Task creation will insert spawn statements and channel access statements in the control flow graph. These are represented as a special kind of function call. In a particular embodiment of the present invention user directives provide three ways to select statements for task creation:

make_process(function) selects all statements in the function body;

make_process(function::label) selects a single (but possibly hierarchical) labeled statement; and make_process(function::label1-label2) selects all statements from label1 to label2 inclusive.

Each user directive creates a new task; together with the original "main" task, n directives result in n+1 tasks. SPRINT will automatically insert communication channels for variables accessed in more than one task. If the communication pattern for some variable is too complex to be analyzed by SPRINT, an error message is issued. As a bypass mechanism, a shared_variable (var) directive tells SPRINT to ignore all accesses to var for analysis and leave accesses as-is for code generation. When the shared_variable directive is used, functional equivalence is no longer guaranteed: it is the user's responsibility to ensure that accesses to var are correctly synchronized through scalar or block FIFO's. Structured statement reconstruction is based on natural loops and some heuristics; it is independent of how the input code was structured. SPRINT inserts two kinds of channels: scalar FIFO channels and block FIFO channels. Scalar FIFO channels are the familiar FIFO's with blocking put and get methods; they are used to communicate scalar values, i.e. values that can be written or read in one operation. Block FIFO channels are used to communicate values that are too large to be written or read in one operation. Blocks are essentially arrays of scalars. Both the producer and the consumer tasks start with a (blocking) request operation to open the next block, followed by any number of write or read operations, followed by a commit operation to close the block. In the producer, the request operation opens an uninitialized block; in the consumer, it opens the next block committed by the producer.

TABLE 2

Signatures of access methods of the channels supported by SPRINT. T is the scalar base type of the FIFO.

| | Producer methods | | consumer methods | |
|---|---|---|---|---|
| Scalar FIFO | void put(T) | | T get( ) | |
| Block FIFO | Void T void void commit( ) | request( ) read(int) write(T, int) | void T void void commit( ) | request( ) read(int) write(T, int) |

The signatures of the channel access methods are summarized in Table 2. Note that a block FIFO producer can read as well as write, and a block FIFO consumer can write as well as read. Scalar and block FIFO channels can be mapped in different ways to the target platform. SPRINT defines the access methods but not the implementation.

Task creation consists of seven steps. These steps are executed for each make_process directive and either result in an error message or in a transformed CFG that is functionally equivalent to the original CFG, but with an extra task containing the statements selected in the user directive.

Step 1. Single-Entry Single-Exit Check

Control flow edges entering the selected group of statements are called entry edges; a statement at which such an edge ends is an entry statement. Similarly, control flow edges leaving the selected group of statements are called exit edges; a statement at which such an edge ends is an exit statement. If there is more than one entry or exit statement, issue an error message.

Step 2. Single Parent Task Check

The function containing the selected statements is called the parent function of the new task. If the parent function is called from two or more tasks, channels to or from the new task will not be point-to-point; issue an error message. The task calling the parent function is called the parent task.

Step 3. Split Channel Access Check

Channel access statements may have been inserted in the parent process during a previous task creation. Channel access statements accessing the same channel must stay in the same process to guarantee the correct order of execution. They must either all stay in the parent process or all move to the new process. Otherwise, issue an error message.

Step 4. Identification of Communication Channels

SPRINT attempts to insert a communication channel for each variable that is referred to by a statement of the new task as well as a statement of the parent task. The variable is called the base variable of the channel. If the attempt fails, an error message is issued.

Due to the existence of pointers in C, a variable reference is not the same as a variable access. A statement refers to a variable if the variable's name is mentioned in the statement. It can either directly access (read or write) the variable, or take the address of the variable. A statement accesses a variable if it reads from or writes to the variable. Reads and writes can be direct or indirect (through a pointer).

Step 5. Task Creation

SPRINT creates static tasks: all tasks are spawned at the beginning of the main function. Task code consists of an infinite loop containing the statements of the task from entry statement to exit edges. In the parent task, the selected statements are removed: entry edges are set to point to the exit statement.

Step 6. Scalar FIFO Channel Insertion

If the base variable is scalar and its address is not taken, a scalar FIFO channel is considered. A scalar variable in C is a variable that is not an array, struct or pointer. Examples of scalar types in C are 'int', 'unsigned char' and 'float'. A variable is live at an edge in the control flow graph if the edge is on a path from a statement writing the variable to a statement reading the variable. An output FIFO is created if the base variable is live at an exit edge but not at an entry edge. A put statement is inserted at the end of the task body, and a get statement is inserted in the parent process before the exit statement. An input FIFO is inserted if it is live at an entry edge but not at an exit edge, and also if it is live at both an entry edge and an exit edge but never written in the new task. A get statement is inserted at the beginning of the task body, and a put statement is inserted in the parent process before the exit statement. Put statements are moved back and get statements are moved forward as far as possible over statements that do not access the base variable.

Step 7. Block FIFO Channel Insertion

In principle, block FIFO channels can be used for any combination of arrays and structs, but only arrays are currently supported. Block FIFO insertion is more complex than scalar FIFO insertion for two reasons. To copy a block is expensive and must be avoided. To avoid copying, an array to be communicated will be constructed directly in the block FIFO. This means that every access to the array must be replaced by a read or write operation on the block FIFO. Arrays are often passed to functions using pointer parameters. Interprocedural analysis is required to determine which pointer points to which array. If a pointer can point to more than one array, all the arrays it can point to must be mapped to the same block FIFO, or else a dereference of that pointer cannot be replaced by a single read or write operation on a fixed block FIFO channel. SPRINT implements a simple interprocedural pointer analysis based on array aliases. An array alias is a formal parameter with a pointer type that is never written (except for initialization when the function is called), and for which each corresponding actual argument is either the address of the first element of an array or another array alias. If the base variable is an array, a block FIFO containing only that array is created. If any alias for that array can also point to another array, an error message is issued. If the base variable is an array alias, a block FIFO containing all the arrays it can point to is created. An error message is issued if any alias for an array mapped to the block FIFO can also point to an array not mapped to the block FIFO or if the lifetimes of these arrays overlap. If two arrays are live at the same statement but only on different call paths, their lifetimes do not overlap. The block FIFO is considered live at an edge if any array mapped to the block FIFO is live at that edge. If the block FIFO is live both at an entry edge and at an exit edge, an error message is always issued, even if the new task only reads it. Otherwise, block FIFO insertion follows the same rules as scalar FIFO insertion.

Figure 5:
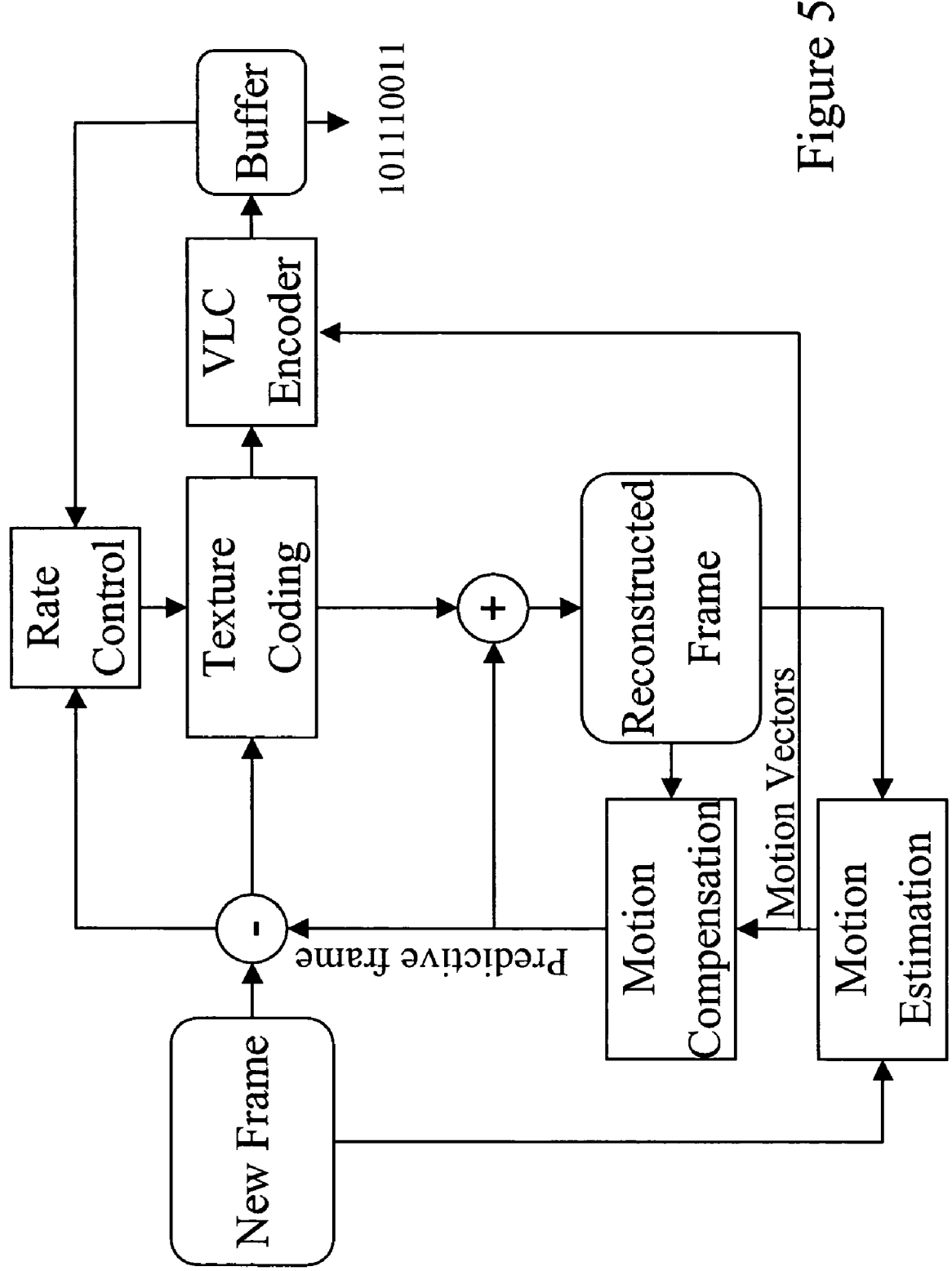
FIG. 5 is a block diagram of an MPEG-4 encoder wherein an embodiment of the invention can be implemented.

The SPRINT tool as described has been applied to several applications. In this section we demonstrate the use of SPRINT on two of these applications: an Embedded Zero Tree (EZT) coder and an MPEG-4 encoder. The EZT coder is part of a wavelet based compression chain. Exploiting the correlation between the wavelet coefficients in the detail image, it performs an intelligent run length coder. A detailed description can be found in [B. Vanhoof, M. Peón, G. Lafruit, J, Bormans, L. Nachtergaele, and I. Bolsens, "A Scalable Architecture for MPEG-4 Wavelet Quantization", Journal of VLSI Signal Processing Systems for Signal, Image, and Video Technology Vol. 23, No. 1, pp. 93-107, October 1999.] This medium-sized application, approximately 800 lines of C-code, has interesting multirate functionality. First there is the conversion from parallel input data to bit-level processing. This means that every input block of data produces several output data blocks. Second there is the data-dependent output production in the variable length coder: the output data is produced conditionally. Moreover, the pipelining of this example was realized without using shared_variable directive and consequently SPRINT guarantees the functional equivalence between the original C code and the generated SystemC code. The second design case is a Simple Profile MPEG-4 video encoder [K. Denolf, C. De Vleeschouwer, R. Turney, G. Lafruit, and J. Bormans, "Memory Centric Design of an MPEG-4 Video Encoder", To appear in IEEE CSVT, special issue on integrated multimedia platforms]. As shown in FIG. 5 the functional block diagram of an MPEG-4 encoder consists of five major functional units: the Motion Estimation exploiting temporal redundancy in the video sequence, the Motion Compensation providing a motion compensated version of the input sequence, the Texture Coding computing and quantizing the error after Motion Compensation, the VLC Encoder compressing the data stream, and the Rate Control providing the overall system configuration setting to achieve a specified average compression performance. Next to these functional units, three memories can be identified: the New Frame containing the input data, the Reconstructed Frame containing a reference decoder frame used to perform Motion Estimation and Motion Compensation, and a Buffer storing the compressed bit stream. The total code size of the MPEG-4 encoder is 11,000 lines of C code. From this MPEG-4 encoder four main computation processes have been split off:

Motion Estimation, Motion Compensation, Texture Coding, VLC Encoder. Next to these computation processes, two memory transfer processes have been identified: an input copy controller transferring the data from the New Frame memory to the computation processes Motion Estimation and Texture Coding, and a reconstructed copy controller transferring the data from the Reconstructed Frame to the computation processes Motion Estimation and Motion Compensation. Running on a Linux PC (Red Hat 7.1, Linux version 2.4.20) with a Pentium4 2.80 GHz processor, with 1 GB of memory, the SPRINT transformation from C to SystemC takes 650 seconds. Both the original C code and the SystemC generated code were tested with the foreman CIF sequence containing 300 frames at 25 frames per second. The simulation time of the original C code was 26.4 seconds, while the SystemC version generated by SPRINT required 43.3 seconds. The difference in simulation time is almost completely caused by the context switches in the multi-threaded simulation in SystemC.

Below, more details, in particular more definitions, on a possible implementation of the steps taken to transform sequential code to process level pipelined code are listed, in particular the step of process insertion is discussed in detail (step 4). In this embodiment of the invention the following steps are recognized (see FIG. 3 and FIGS. 1 and 6):

1. Start from a sequential program, written in a procedural programming language such as C.
2. Parse the program into an abstract syntax tree (AST), e.g. using the EDG front-end.
3. Flatten the AST to obtain a control flow graph (CFG). At this point, the CFG still represents a sequential program; in other words, it contains only one process.
4. Create a new process from a group of statements identified in a process creation pragma. This results in a transformed CFG with an additional process. Insert communication channels in such a way that the transformed CFG is functionally equivalent to the original CFG. [Two CFG's are functionally equivalent if their externally visible behavior ignoring timing is the same. For example, functionally equivalent CFG's will produce the same output files from a given set of input files, but the order of writing to the output files may differ.]
5. Repeat step 4 for each process creation pragma. For N process creation pragmas, this results in a CFG with N+1 processes that is functionally equivalent to the original CFG.
6. Convert the transformed CFG to a new AST. Regenerate code structure during this transformation. [Structured code uses if-then-else statement, for-loops, while-loops, and similar hierarchical statements to represent control flow. Unstructured code relies on go-to statement and labels to represent control flow.]
7. Unparse the new AST to generate the output code. The output language must have constructs to represent multiple processes and communication primitives. Examples of such languages are SystemC and Tipsy.

Concepts and Terminology

A CFG is a directed graph with statements as nodes and control transfers as edges. The execution of a CFG starts at the statement designated as entry statement. During execution, a statement reads and writes variables. After execution, it transfers control over zero or more outgoing edges to other statements, and these statements execute in turn. Execution of the CFG ends when no more statements execute.

The following kinds of statements are used:

A return statement has no outgoing edges.

A sequence statement has exactly one outgoing edge. After execution, it always transfers control via this outgoing edge.

A choice statement has two outgoing edges. It evaluates a boolean condition that is a function of variables read by the choice statement. If the condition is true, control is transferred via the first outgoing edge. If the condition is false, control is transferred via the second outgoing edge.

A call statement is a sequence statement that invokes a function (or routine) and waits until execution of the function ends. Then, control is transferred via the outgoing edge.

A spawn statement is a sequence statement that invokes a function and immediatly transfers control via the outgoing edge. It does not wait until execution of the function ends. Execution of a spawn statement creates a new process. The process ends when the execution of the function ends. A CFG without spawn statements is a sequential CFG, representing a sequential program.

A channel access is a sequence statement that invokes an access method of a communication channel and waits until execution of the access method ends. Then, control is transferred via the outgoing edge. Channels and channel accesses are inserted by SPRINT during process creation. Every communication channel defines a fixed number of access methods; the effect of invoking a method depends on the channel and the method.

A clear statement is a sequence statement that invalidates the value of and all pointers to a variable.

SPRINT will also work for CFG's with variants of these statement kinds; an example would be a choice statement with more than two outgoing edges.

Spawn and call statements invoke a function. A function (sometimes also called procedure or subroutine) has a nested CFG that is called the function body. To invoke a function is to instantiate (i.e. create a distinct copy of) the function body and execute the entry statement of the instantiation. Execution of the function ends when no more statements in the function body execute. For uniformity, the top-level CFG representing the whole program is considered to be the body of a special function called the main function, and the main function is considered to be invoked by a spawn statement that is not explicitly represented. The process created by this implicit spawn statement is called the main process. The main function cannot be invoked by any other statement. An external function is a function with an unknown body. It could result from a call to a library function for which no code is available during parsing.

A process is said to be static if it is created unconditionally at the beginning of the execution of a program and does not end before the execution of the program ends. A process that is not static is said to be dynamic. The process creation method described further creates static processes.

The invocation graph of a program is a directed graph with the functions (including the main function) of the program as nodes and an edge from function F to function G iff F can invoke G. The list of spawn and call statements in F that can invoke G is annotated on the edge. Note that in general, this is a graph and not a tree: functions can recursively invoke each other. The construction of the invocation graph of a given program (represented by a CFG) can be very complex in general, especially if the program contains function pointers, and can even be undecidable, for example if it depends on characteristics of input data or external functions. When an exact analysis is not feasible, an edge must be added from F to G if it cannot be determined with certainty that F will not invoke G.

Variables can be local or global. Local variables belong to a function; they can only be referenced by statements in that function. Local variables are instantiated when the function is invoked and deleted when execution of the function ends. If a function is invoked again when it is already executing, the second invocation has its own distinct instantiation of local variables.

Global variables belong to a program; they can be referenced by statements in any function invoked by that program. Global variables are instantiated when execution of the top level CFG starts and deleted when execution of the top level CFG ends. All functions access the same instance of global variables. Variables types include at least the data types available in the source language. Pointer variables can contain the address of (a part of) another variable, or the address of a function. A statement can dereference a pointer to access the variable it points to, or to invoke the function it points to. A data type that is not a pointer type and does not contain any pointer type is said to be pointer-free. Pointer-free types include:

integer, floating point and enum types;
structs that have only fields with non-pointer types;
arrays of elements with a non-pointer type.

A statement accesses a variable if it reads from or writes to the variable. Reads and writes can be direct or indirect (through a pointer). A statement refers a variable if it directly reads from or writes to the variable, or it takes the address of the variable, or it dereferences the (pointer) variable.

For example, in the following C-like pseudo-code:
1: A=0;
2: B=&A;
3: *B=1;

Statement 1 accesses and refers to A, statement 2 refers to A but does not access it, and statement 3 accesses A but does not refer to it.

A shared variable is a variable that can be accessed by more than one process. A shared variable is a variable that is accessed by exactly one process.

A variable V is said to be live at an edge E in the CFG if there is a path from a statement that writes a value to V through E to a statement that reads that value from V. V is said to be dead if it is not live. Liveness analysis can be very complex in general, especially if V can be accessed indirectly (through pointers) as well as directly, or if V is an array that can contain more than one value. It can even be undecidable, for example if it depends on characteristics of input data or external functions. In a function body, liveness can differ between invocations of the function. When an exact analysis is not feasible, a variable must be considered live if it cannot be determined with certainty that it is dead.

Pointer analysis determines for each pointer dereference the set of variables or functions that can be accessed or invoked. This set is called the dereference's target set. Pointer analysis can be very complex in general, and can even be undecidable, for example if it depends on characteristics of input data or external functions. In a function body, pointer analysis results can differ between invocations of the function. When an exact analysis is not feasible, a variable or function must be added to the target set of a dereference if it cannot be determined with certainty that the dereference will not access the variable or invoke the function.

The communication channels inserted by SPRINT are uni-directional point-to-point channels. A point-to-point channel is a channel that is accessed by exactly two processes. In a uni-directional point-to-point channel, one of the two processes is called the producer process and the other process is called the consumer process. Data is never communicated through the channel from the consumer to the producer. The best known example of a uni-directional point-to-point channel is a "FIFO" channel. A FIFO channel has two access methods:

put(data), to be invoked from the producer process, puts data at the back of a queue. If the queue is full, it first waits until the queue has room for the data.

data=get( ), to be invoked from the consumer process, gets data from the front of a queue. If the queue is empty, it first waits until the queue contains data. Another, more complex example of a uni-directional point-to-point channel is an "object FIFO" channel. An object FIFO channel has eight access methods, four to be invoked from the producer process and four to be invoked from the consumer process.

producer_request( ) reserves a fixed size array of data tokens in the channel, at the back of a queue of such arrays. If the queue is full, it first waits until room becomes available.

producer_write(index,data) stores data in the currently reserved array at the specified index.

data=producer_read(index) fetches data from the currently reserved array at the specified index.

producer_commit( ) releases the currently reserved array. A new array can now be reserved by the producer_request method.

consumer_request( ) waits until an array is available at the head of the queue and released by the producer, and selects it as current array.

data=consumer_read(index) fetches data from the current array at the specified index.

consumer write(index,data) stores data in the current array at the specified index.

consumer_commit( ) releases the current array. A new array can now be selected by the consumer_request method.

A statement group G is a set of statements belonging to the same function. A process creation pragma identifies a statement group to be moved to a new process. An entry edge of G is an edge in the CFG from a statement outside G to a statement inside G. An exit edge of G is an edge in the CFG from a statement inside G to a statement outside G. An entry statement of G is the target of an entry edge of G. All entry statements of G are inside G.

An exit statement of G is the target of an exit edge of G. All exit statements of G are outside G. An exit statement of a group of statements is a statement not in the group to which control can be transferred from a statement inside the group.

A single-entry group of statements has exactly one entry statement. A single-exit group of statements has exactly one exit statement. A group of statements to be moved to a new process must be single-entry and single-exit. If the group of statements identified by a pragma is not single-entry or not single-exit, it can be transformed to a single-entry single-exit group (step 4.1).

Every process that can execute a statement of statement group G is said to be a parent process of G.

In the following a more detailed embodiment of the present invention will be described. It is assumed that the first two steps described above, namely parsing the essentially sequential code and generation of an abstract syntax tree (AST) have been carried out.

Step 3: AST Flattening to CFG

The translation of an AST to a flat CFG is straight-forward, with the possible exception of the insertion of clear statements for nested variables. In some procedural programming languages (including C), a structured statement can contain declarations of nested variables. A nested variable can only be referred to by statements nested in the structured statement. There can be two kinds of nested variables (called static and automatic in C).

A variable of the first kind (called static in C) is allocated statically (i.e. at a fixed address) and keeps its value between executions of the structured statement. In the CFG, it is represented by a global variable. If desired, the information that it is only refered to by certain statements can easily be reconstructed from the CFG. A variable of the second kind (called automatic in C) loses its value after an execution of the structured statement and can be allocated at a different address for every execution of the statement. In the CFG, it is represented by a local variable, plus zero or more clear statement inserted at exit edges of the group of statements representing the structured statement in the CFG. Clear statements provide potentially very useful information for variable liveness analysis that would otherwise be lost during AST to CFG flattening.

Step 4: Process Creation

Step 4.1 Preliminary Analysis
1. Perform pointer analysis.
2. Construct the invocation graph of the program.
3. Perform liveness analysis.

The algorithms used in SPRINT for preliminary analysis are not described here. Such algorithms have been published by others, for example in the context of research on optimizing compilers (especially interprocedural optimization) and parallelizing compilers. Techniques to partially or fully delay these analyses until the result is actually needed by subsequent steps of the algorithm (on-demand evaluation) are also well-known and can be applied.

Step 4.2 Obtain a Single-Entry Single-Exit Statement Group

To transform a multi-entry group of statements to a single-entry group:
1. Assign a unique number $N(E)$ to each entry statement E in the group.
2. Create a variable V that can contain any $N(E)$.
3. Create a tree of choice statements that transfers control to the entry statement E identified by the value of V ($N(E)==V$). Include these choice statements in the group. The root R of the tree will become the single entry statement of the group.
4. For each entry statement E, create a sequence statement $A(E)$ that assigns $N(E)$ to V and transfers control to R.
5. Change each statement S outside the group that transfers control to an entry statement E in the group such that it now transfers control to $A(E)$.

To transform a multi-exit group of statements to a single-exit group:
1. Assign a unique number $N(E)$ to each exit statement E of the group.
2. Create a variable V that can contain any $N(E)$.
3. Create a tree of choice statements that transfers control to the exit statement E identified by the value of V ($N(E)==V$). Do not include these choice statements in the group. The root R of the tree will become the single exit statement of the group.
4. For each exit statement E, create a sequence statement $A(E)$ that assigns $N(E)$ to V and transfers control to R.
5. Change each statement S inside the group that transfers control to an exit statement E of the group such that it now transfers control to $A(E)$.

Step 4.3 Check that the Statement Group has One Parent

If the statement group G has no parents, it represents "dead" code and can be removed from the CFG. No process is created in this case.

If G has more than one parent, communication channels to and from the new process are not point-to-point. This case cannot be handled by the process creation method. Issue an error message.

To check that the statement group has one parent:
1. Find paths in the invocation graph with the following properties:
a. The path starts a function with at least one incoming edge that corresponds to at least one spawn statement. Note: the main function is such a function.
b. All edges in the path correspond to at least one call statement.
c. The path ends on the function containing the statement group G.
2. If no paths are found, G has no parents and the analysis is complete.
3. Otherwise, make a list of all spawn statements corresponding to an incoming edge of a function at which a path starts. These are the spawn statements that can create a parent process of G.
4. Check that at most one of these spawn statements will be executed by the program, and that it will be executed at most once. If all processes are static, each spawn statement is executed exactly once, so this is equivalent to checking that the list contains at most one spawn statement.

Step 4.4 Check that Existing Channels Remain Point-to-Point

If the statement group G contains a channel access statement to a channel C, check that it contains all channel accesses to C in the parent process of G. Otherwise, issue an error message. This ensures that a channel created during a previous process creation step will remain point-to-point.

Step 4.5 Identify the Required Communication Channels

Let G be the group of statements with a single parent process P, and assume that the statements in G are to be moved to a new process Q. For each variable V referenced by a statement in G, identify the required communication channels (if any) as follows.
1. If V is only accessed by statements executed in Q, no communication channels are required. Statements executed in Q are the statements in G plus the statements executed in a function invoked by a statement executed in Q.
2. Otherwise, if V is a pointer variable and all dereferences of V by statements executed in Q access only process variables of Q, no communication channels are required.
3. Otherwise, if V is dead at all entry and exit edges of G, no communication channels are required.
4. Otherwise, if the user has provided a shared variable pragma for V, no communication channels are required, but a warning that functional equivalence is not guaranteed should be issued;

5. Otherwise, a channel between P and Q is required. V is said to be the root variable of the channel. The direction and other characteristics of the channel will be determined further.

Step 4.6 Identify the Set of Primary Variables for Each Channel

The root variable of a channel is not necessarily the variable that contains the data that will be communicated through the channel. It can also be a pointer to the variable or variables that contain the data. A variable that (in the CFG before process creation) can contain data that will be communicated through the channel (in the CFG after process creation) is called a primary variable of the channel. For each channel identified in step 4.5, find the corresponding set of primary variables as follows.
1. If the type of the channel's root variable is pointer-free, the root variable is the one and only primary variable for the channel.
2. Otherwise, if the channel's root variable is a pointer, and the types of all the variables it can point to are pointer-free, the set of variables that the root pointer can point to is the set of primary variables.
3. Otherwise, Issue an Error Message.

Step 4.7: Determine the Channel Type

For each channel identified in step 4.5, execute the following steps to determine channel type.

In general, the channel type to be used for a given channel depends on the set of available channel types, on the data types of the root variable and the primary variables of the channel, and on channel selection pragmas if present for this channel. In the current implementation, the following algorithm is used.
1 If all primary variables of the channel have the same pointer-free type that is not an array type, use a FIFO channel with the type of the primary variables as token type.
2 Otherwise, if all primary variables of the channel have an array type with the same base type (but possibly different sizes), use an object FIFO with the type of the largest primary variable as token type.
3 Otherwise, issue an error message.

Step 4.8: Determine the Channel Direction

Let G be the group of statements with a single parent process P, and assume that the statements in G are to be moved to a new process Q.
1. If no primary variable of the channel is live at an entry edge of G, this is an output channel (from Q to P).
2. Otherwise, if no primary variable of the channel is live at an exit edge of G, this is an input channel (from P to Q).
3. Otherwise, a bidirectional channel is required. Issue an error message.

Step 4.9: Channel Specific Check

For an object FIFO channel, perform the following checks.
1. If more than one primary variable of the channel is live at the same statement, issue an error message.
2. If the set of variables that can be accessed by some pointer dereference includes both a primary variable of the channel and a variable that is not a primary variable of the channel, issue an error message.

Step 4.10: Insert the New Process

Insert a single-entry single-exit group of statements G with parent process P in a new process Q as follows.
1. Change every entry edge of G so that it now transfers control to the exit statement of G.
2. Change every exit edge of G so that it now transfers control to the entry statement of G.
3. Create a new function F with the entry statement of G as entry statement of the function body.
4. Insert a spawn statement for F in the body of the main function as new entry statement, and insert an edge from the new spawn statement to the previous entry statement.
5. Perform liveness analysis again. Now that a new process has been inserted and statements have been moved to the new process, liveness wil have changed.

Step 4.11: Determine Data Transfer Edges

It is important that the channel access statement that transfers data from the producer process to the channel (put for FIFO channels, producer-commit for object FIFO channels) is executed as early as possible but not before the last producer access to the data, and that the channel access statement that transfers data from the channel to the consumer process (get for FIFO channels, consumer-request for object FIFO channels) is executed as late as possible but not after the first consumer access to the data. This will not only maximize parallelism, but also keep channel access statements for the same channel close together so that the probability that step 4.4 succeeds for later process creation steps increases.

A producer data transfer edge of a channel is an edge in the CFG from statement S to statement T in the producer process such that a primary variable of the channel is live at S but dead at T (after process insertion).

A consumer data transfer edge of a channel is an edge in the CFG from statement S to statement T in the consumer process such that a primary variable of the channel is dead at S but live at T (after process insertion).

Step 4.12 Insert Channels

The steps to be executed for channel insertion depend on the channel type.

For a FIFO channel, do the following.
1. Create a variable V of the same type as the FIFO tokens.
2. Replace each access to a primary variable of the channel in the new process Q by an access to V.
3. Insert a put statement at every producer data transfer edge.
4. Insert a get statement at every consumer data transfer edge.

For an object FIFO channel, do the following.
1. At every edge in the CFG from statement S to statement T in the producer process for which a primary variable is dead at S but live at T, insert a producer-request statement.
2. At every edge in the CFG from statement S to statement T in the consumer process for which a primary variable is live at S but dead at T, insert a consumer-commit statement.
3. Insert a producer-commit statement at every producer data transfer edge.
4. Insert a consumer-request statement at every consumer data transfer edge.
5. Replace each read access to a primary variable of the channel in the producer process by a producer-read statement.
6. Replace each read access to a primary variable of the channel in the consumer process by a consumer-read statement.
7. Replace each write access to a primary variable of the channel in the producer process by a producer-write statement.
8. Replace each write access to a primary variable of the channel in the consumer process by a consumer-write statement.

One advantage of various inventive embodiments is that it enables implementation of applications on embedded multi-processor systems or platforms, in particular heterogeneous embedded systems or platforms, by providing an automated approach to split the application code into communicating parallel tasks. An application which requires parallel processing on the same or multiple processors is, among others, streaming, e.g. multimedia streaming.

Another advantage of various inventive embodiments is good parallelization for performance and power whereas manual parallelization is time consuming and error-prone, and therefore typically only done once in a design cycle. A further advantage of the various inventive embodiments is the enabling of parallelization exploration.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A computer based method of automatically transforming essentially sequential application code into a plurality of functionally equivalent codes, comprising:
    receiving the essentially sequential application code;
    receiving instructions separate from the essentially sequential application code, the instructions marking task boundaries within the essentially sequential application code to thereby define a plurality of tasks, said receiving being based on analysis of said essentially sequential application code;
    determining whether the essentially sequential application code can be separated at at least one of the tasks boundaries by performing a data flow analysis, globally over said essentially sequential application code across program constructs of said essentially sequential application code wherein determining whether the essentially sequential application code can be separated comprises:
    determining, globally over the essentially sequential application code, liveness information of substantially all of the variables in the code; and thereafter
    determining, for at least one of the tasks, whether it can be separated by only evaluating the liveness information at at least one of the task boundaries; and if the essentially sequential application code can be separated at at least one of the tasks boundaries; and
    automatically generating at least one of the plurality of functionally equivalent codes for at least two of the tasks.

2. The method of claim 1, wherein the plurality of codes define a task-level parallelized version of the essentially sequential application code.

3. The method of claim 1, wherein determining whether the essentially sequential application code can be separated comprises generating a message indicating at which task boundaries the essentially sequential application code cannot be separated.

4. The method of claim 2, wherein the task-level parallelized version of the essentially sequential application code is pipelined code, comprising at least two tasks, wherein one of the tasks produces data in a first time frame for consumption by the other of the tasks in a second later time frame, and wherein the tasks are executable simultaneously and communicate with each other by a first in first out (FIFO) channel.

5. The method of claim 1, wherein the essentially sequential application code comprises at least one function, and at least two of the generated codes each include a portion of the function.

6. The method of claim 1, wherein the essentially sequential application code is in an arbitrary format.

7. The method of claim 1, wherein determining liveness information comprises performing a data flow analysis.

8. The method of claim 7, wherein the data flow analysis includes pointer analysis.

9. The method of claim 7, wherein performing data flow analysis treats an access to an array element as an access to the whole array.

10. The method of claim 7, wherein performing data flow analysis comprises a static data flow analysis.

11. The method of claim 1, wherein determining and automatically generating code partly operate on a control flow graph description of the essentially sequential application code.

12. The method of claim 1, wherein the task boundaries comprise task boundaries across program constructs.

13. The method of claim 1, wherein automatically generating at least one of the plurality of functionally equivalent codes comprises automatically including instructions for communication between the tasks.

14. The method of claim 1, further comprising, subsequent to the automatically generating of functionally equivalent codes, simulating said functionally equivalent codes and repeating the process of receiving instructions separate from the essentially sequential application code, wherein said analysis of said essentially sequential application code being based on said simulation.

15. The method of claim 14, wherein the generating of functionally equivalent codes is a part of a performance optimization process.

16. The method of claim 14, wherein the generating of functionally equivalent codes is a part of a task communication overhead minimization process.

17. The method of claim 14, wherein the generating of functionally equivalent codes is a part of an energy consumption minimization process.

18. The method of claim 17, further comprising:
    compiling the plurality of generated codes, with a compiler suited for a processor of a multiprocessor system; and
    executing the plurality of generated codes on the assigned processor at least partly concurrently,
    wherein the energy consumption minimization process minimizes the energy consumption of the multiprocessor system.

19. A method of executing an essentially sequential application code on a multiprocessor system, the method comprising:
    receiving the essentially sequential application code;
    receiving instructions separate from the essentially sequential application code, the instructions marking task boundaries within the essentially sequential application code to thereby define a plurality of tasks, said receiving being based on analysis of said essentially sequential application code;
    determining whether the essentially sequential application code can be separated at at least one of the tasks boundaries by performing a data flow analysis, globally over said essentially sequential application code across program constructs of said essentially sequential application code wherein determining whether the essentially sequential application code can be separated comprises:

determining, globally over the essentially sequential application code, liveness information of substantially all of the variables in the code; and thereafter determining, for at least one of the tasks, whether it can be separated by only evaluating the liveness information at at least one of the task boundaries; and if the essentially sequential application code can be separated at at least one of the tasks boundaries; and automatically generating at least one of the functionally equivalent codes for at least two of the tasks, thereby generating a plurality of codes;

compiling the plurality of generated codes, with a compiler suited for the processor of the multiprocessor system; and executing the plurality of generated codes on the assigned processor at least partly concurrently.

20. The method of claim 19, further comprising assigning a processor of the multiprocessor system to each of the plurality of functionally equivalent codes, wherein the plurality of generated codes are compiled with a compiler suited for the processor assigned to the plurality of generated codes.

21. The method of claim 19, wherein the generating of functionally equivalent codes is a part of an energy consumption minimization process which minimizes the energy consumption of the multiprocessor system.

22. A computer based system for automatically transforming essentially sequential application code into a plurality of functionally equivalent codes, comprising:

a processor;

means for receiving the essentially sequential application code;

means for receiving instructions separate from the essentially sequential application code, the instructions marking task boundaries within the essentially sequential application code to thereby define a plurality of tasks, said receiving being based on analysis of said essentially sequential application code;

means for determining whether the essentially sequential application code can be separated at at least one of the tasks boundaries by performing a data flow analysis, globally over said essentially sequential application code across program constructs of said essentially sequential application code wherein determining whether the essentially sequential application code can be separated comprises:

determining, globally over the essentially sequential application code, liveness information of substantially all of the variables in the code; and thereafter determining, for at least one of the tasks, whether it can be separated by only evaluating the liveness information at at least one of the task boundaries; and if the essentially sequential application code can be separated at at least one of the tasks boundaries; and means for automatically generating at least one of the plurality of functionally equivalent codes for at least one of the tasks.

23. The system of claim 22, wherein the means for determining generates a message indicating at which task boundaries the essentially sequential application code cannot be separated.

24. The system of claim 22, wherein the means for automatically generating code includes means for automatically including instructions for communication between tasks.

25. The system of claim 22, wherein the task boundaries comprise task boundaries across program constructs.

26. A machine readable data storage device storing a computer program comprising program code which, when executed on a processing engine, automatically transforms essentially sequential application code into a plurality of functionally equivalent codes, the program code when executed comprising:

receiving the essentially sequential application code;

receiving instructions separate from the essentially sequential application code, the instructions marking task boundaries within the essentially sequential application code to thereby define a plurality of tasks, said receiving being based on analysis of said essentially sequential application code;

determining whether the essentially sequential application code can be separated at at least one of the tasks boundaries by performing a data flow analysis, globally over said essentially sequential application code across program constructs of said essentially sequential application code wherein determining whether the essentially sequential application code can be separated comprises:

determining, globally over the essentially sequential application code, liveness information of substantially all of the variables in the code; and thereafter determining, for at least one of the tasks, whether it can be separated by only evaluating the liveness information at at least one of the task boundaries; and if the essentially sequential application code can be separated at at least one of the tasks boundaries; and automatically generating at least one of the plurality of functionally equivalent codes for at least one of the tasks.

27. A computer based method for automatically transforming essentially sequential application code into a plurality of functionally equivalent codes, comprising:

receiving the essentially sequential application code;

parsing the essentially sequential application code into a control data flow graph, optionally following by flattening the obtained control data flow graph;

initializing, in the control data flow graph, the essentially application code as one global task;

receiving instructions separate from the essentially sequential application code, the instructions marking task boundaries within the essentially sequential application code to thereby define a plurality of tasks;

analyzing data flow globally on the control data flow graph for determining liveness information of substantially all of the variables in the code; thereafter determining for at least one of the tasks whether it can be separated by only evaluating the liveness information at at least one of the task boundaries, and if so modify the control data flow graph to separate the task wherein determining whether the essentially sequential application code can be separated comprises:

determining, globally over the essentially sequential application code, liveness information of substantially all of the variables in the code; and thereafter determining, for at least one of the tasks, whether it can be separated by only evaluating the liveness information at at least one of the task boundaries; and if the essentially sequential application code can be separated at at least one of the tasks boundaries; and automatically generating at least one of the plurality of functionally equivalent codes for at least two of the tasks from the modified control data flow graph.

* * * * *